(12) United States Patent
Cook

(10) Patent No.: US 6,237,243 B1
(45) Date of Patent: May 29, 2001

(54) TAPE MEASURE

(76) Inventor: Patrick J. Cook, 1519 Riverview La., Bradenton, FL (US) 34209

(*) Notice: Subject to any disclaimer, the term of this patent is extended or adjusted under 35 U.S.C. 154(b) by 0 days.

(21) Appl. No.: 09/443,566

(22) Filed: Nov. 19, 1999

(51) Int. Cl.$^7$ ...................................... G01B 3/10
(52) U.S. Cl. ................................ 33/770; 33/758
(58) Field of Search ........................... 33/770, 483, 484, 33/485, 486, 493, 494, 755, 758, 759, 760, 761, 768, 771

(56) References Cited

U.S. PATENT DOCUMENTS

| | | | |
|---|---|---|---|
| D. 342,210 | 12/1993 | Grossman | D10/71 |
| 709,665 | * 9/1902 | Cort | 33/761 |
| 1,754,903 | * 4/1930 | Nearing | 33/494 |
| 4,811,489 | * 3/1989 | Walker | 33/494 |
| 4,907,348 | 3/1990 | Hubbard, Jr. | 33/767 |
| 4,930,227 | * 6/1990 | Ketchpel | 33/770 |
| 5,012,590 | * 5/1991 | Wagner et al. | 33/494 |
| 5,062,215 | 11/1991 | Schlitt | 33/755 |
| 5,697,166 | * 12/1997 | Hommel | 33/758 |
| 5,884,408 | * 3/1999 | Simmons | 33/494 |
| 5,895,539 | 4/1999 | Hsu . | |

\* cited by examiner

Primary Examiner—Christopher W. Fulton
(74) Attorney, Agent, or Firm—Charles J. Prescott

(57) ABSTRACT

An improved tape measure and an adhesive strip for a tape measure, the improved tape measure comprising a tape having a concave side and a convex side and a case for housing the tape in a coiled retracted configuration within the case. The tape has one end secured within the case, the other free end being extendible from the case to a substantially full length of the tape. The concave side includes graduations of a first linear scale extending along substantially the full length of the tape, the first linear scale being in metric or U.S. units of linear measure. The convex side has graduations of a second linear scale extending along only a relatively short portion of a length of the tape starting from in close proximity to the free end, the second linear scale being different and distinct from the first linear scale and calibrated for a different and distinct use such as an architectural scale or an engineering scale which are different from those of the first linear scale. Preferably, the second linear scale is formed of a separate thin two-layer adhesive strip as a very thin laminate having a vinyl-type opaque layer onto one side of which the second linear scale is printed and having an adhesive on another side thereof which is attached or attachable to the convex side of the tape. The laminate also preferably includes a transparent abrasion-resistant protective layer attached against and substantially covering the second linear scale of the opaque layer. Alternately, the second linear scale may be formed of a single opaque vinyl adhesive layer adhesively attached or attachable to the convex side of the tape.

15 Claims, 2 Drawing Sheets

TAPE MEASURE

BACKGROUND OF THE INVENTION

1. Scope of Invention

This invention relates generally to tape measuring devices, and more particularly to such a tape measure device carrying a different set of graduations and measurement units on the normally unused convex side of the elongated metal tape of such devices.

2. Prior Art

Tape measures of the type sometimes referred to as "yo-yos" which include an elongated metallic tape stored in coiled form within a housing of the tape measure are well known. The tape is formed typically of thin spring steel having a uniform arcuate cross section wherein the measurement graduations are typically imprinted into the concave side thereof. The scales imprinted on this concave side are usually in fractions of an inch when U.S. measurement scales are used and in millimeter and centimeters when a metric scale is used. However, in many instances of more specialized use, it is desirable to have either an engineering scale of linear measurement in other units than those described above or to have an architectural scale having units which are proportional to larger linear units of feet, yards, meters, etc.

Hubbard, in U.S. Pat. No. 4,9807,348 discloses a navigational tape measure-type apparatus which includes scales graduated for measuring nautical miles, statute miles and kilometers on one side of the flat tape strip for use with a conventional aeronautical chart such as a WAC chart while the other scale for use with, for example, a second different and distinct aeronautical chart or map having a different scale such as a sectional chart. However, in Hubbard, the scales and graduations fully extend on both sides of substantially the entire length of the flat tape strip.

A continuous tape measure invented by Schlitt is disclosed in U.S. Pat. No. 5,062,215 teaching a tape measure which also includes a measuring scale on both sides of the metal tape. However, with this tape measure, the upper or concave surface of the tape is scaled from zero to a number equal to the actual length of the tape while the convex underside of the tape is scaled from the length of the tape to a measurement equal to twice the actual length of the tape. This arrangement allows the measurement of distances equal to twice the length of the tape. Again, however, the measurement scales on the convex side of the tape are generally coextensive with the entire length of the tape. This invention suffers from an additional defect of such tapes having an arcuately-shaped cross sectioned tape formed of thin, highly flexible steel wherein the convex surface of the tape typically becomes abraded and worn away as the tape is continually extended and retracted during use.

Design patent 342,210 invented by Grossman teaches a unique design for a tape of a tape measure wherein the typical spacing between wall studs and the exact foot marks are highlighted for easy viewability. A method of making a two-sided fiberglass tape measure with two differently colored nylon resin coatings for both sides of a fiberglass tape is disclosed in U.S. Pat. No. 5,895,539.

The present invention discloses an improved tape measure and an adhesive strip or applique attachable to a tape of a tape measure in the form of an adhesive strip bearing architectural or engineering scales, or both, which are different from those of a conventional tape measure and which are attachable in one embodiment onto an existing tape measure. The scales applied to the convex side of an otherwise conventional tape measure are foreshortened in length and are substantially shorter than the full length of the tape and further are extremely abrasive resistant so as to resist the abrading effect which the convex side of the tape undergoes during repeated extension and retraction of the tape during use.

BRIEF SUMMARY OF THE INVENTION

This invention is directed to an improved tape measure and an adhesive strip for a tape measure, the improved tape measure comprising a tape having a concave side and a convex side and a case for housing the tape in a coiled retracted configuration within the case. The tape has one end secured within the case, the other free end being extendible from the case to a substantially full length of the tape. The concave side includes graduations of a first linear scale extending along substantially the full length of the tape, the first linear scale being in metric or U.S. units of linear measure. The convex side has graduations of a second linear scale extending along only a relatively short portion of a length of the tape starting from in close proximity to the free end, the second linear scale being different and distinct from the first linear scale and calibrated for a different and distinct use such as an architectural scale or an engineering scale which are different from those of the first linear scale. Preferably, the second linear scale is formed of a separate thin two-layer adhesive strip as a very thin laminate having a vinyl-type opaque layer onto one side of which the second linear scale is printed and having an adhesive on another side thereof which is attached or attachable to the convex side of the tape. The laminate also preferably includes a transparent abrasion-resistant protective layer attached against and substantially covering the second linear scale of the opaque layer. Alternately, the second linear scale may be formed of a single opaque vinyl adhesive layer adhesively attached or attachable to the convex side of the tape.

It is therefore an object of this invention to provide an improved tape measure having a shortened adhesive strip or laminate attached or attachable to the convex surface of the tape and extending only over a short portion thereof starting in proximity to the free end of the tape.

It is another object of this invention to provide an additional set of scales onto a short portion of the unused convex surface of a tape of a tape measure which are distinct and different and distinct from those which are imprinted onto the concave surface of the tape and which are intended to serve a different purpose or use.

It is still another object of this invention to provide an adhesive strip or applique which is adhesively attachable onto a short portion of the convex surface of a tape of a conventional tape measure which, at the users selection, contains one or more linear scales which are calibrated differently and distinctly from those found on the concave side of the conventional tape measure.

It is yet another object of this invention to provide an improved tape measure and an adhesive strip or laminate attachable to the tape of a conventional tape measure which provides one or more different and distinct linear or non-linear scales onto a short distal portion of the tape and which is highly abrasive resistant to scratching, deformation and UV rays as the tape is extended and retracted from the housing of the tape measure during normal use.

It is yet a further object to provide the above invention and improvement which is also very thin and abrasive resistant to the extent of not effecting the normal smooth operation of the extension and retraction of the tape from the case of the tape measure during normal use.

In accordance with these and other objects which will become apparent hereinafter, the instant invention will now be described with reference to the accompanying drawings.

DETAILED DESCRIPTION OF THE INVENTION

Figure 1:
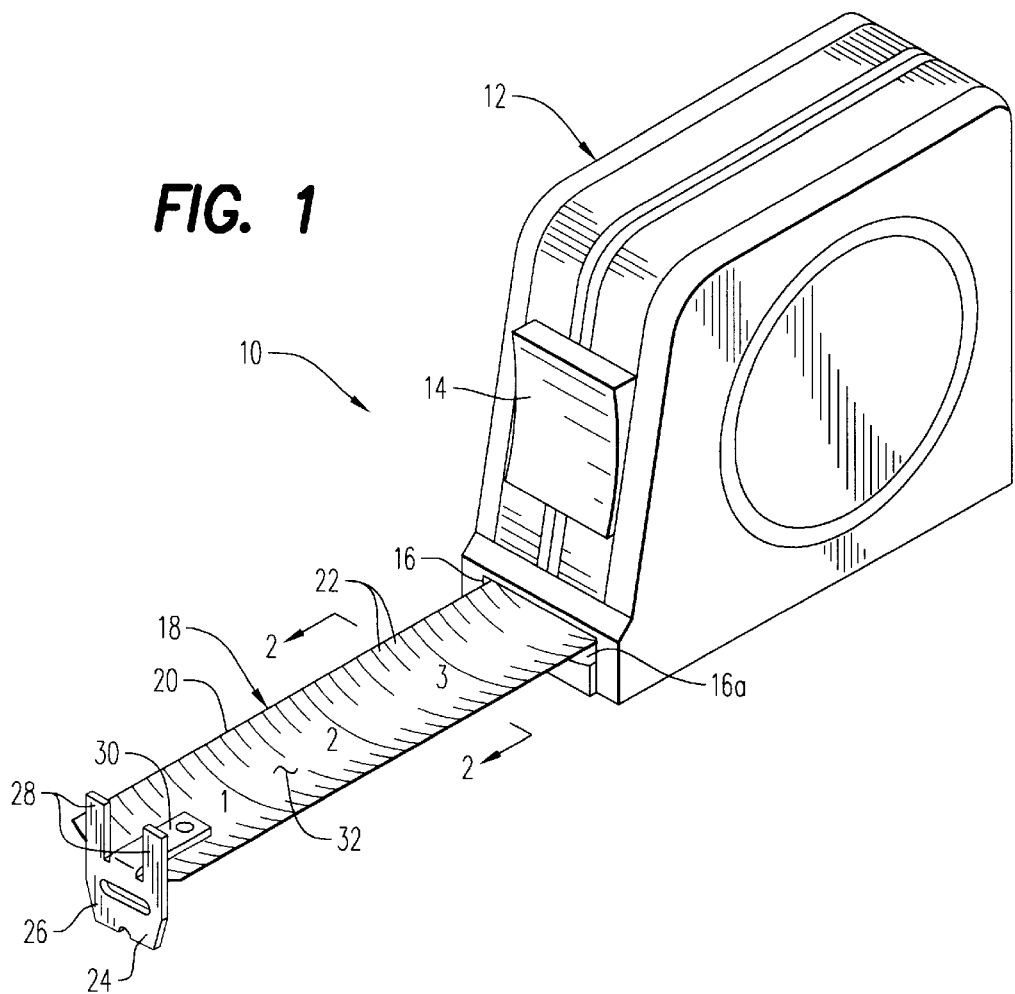
FIG. 1 is a perspective view of the improved tape measure as one embodiment of the invention.

Referring now to the drawings, the improved tape measure of the present invention is generally shown at numeral 10 in FIG. 1. The improved tape measure 10 includes a case shown general at numeral 12 for housing an elongated tape assembly 18 in a well known coiled, refractive configuration within the case 12 when not in use. The tape assembly 18 has a tape 20 whose proximal end thereof secured within the case 12, the other free distal end thereof being fully extendible from the case 12 to a substantially full length of the tape 20.

Figure 2:
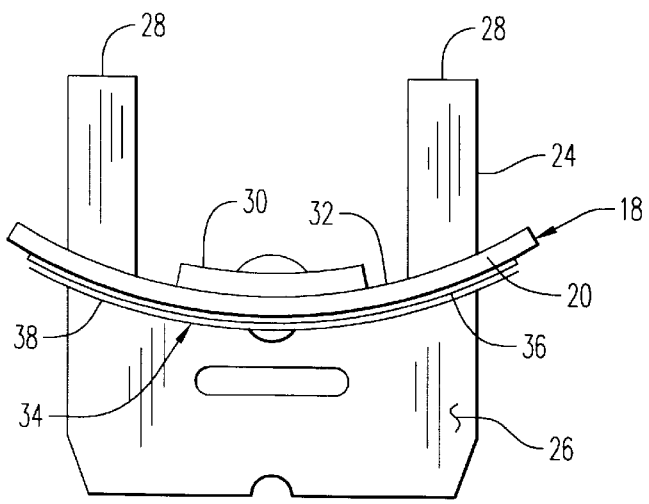
FIG. 2 is a view in the direction of arrows 2—2 in FIG. 1.

The tape 20 is typically formed of metal and preferably spring steel having an arcuate cross section as best seen in FIG. 2. A thumb catch 14 is provided on case 12 to hold the tape 20 in any selected extended position. A stop 24 is provided on the distal free end of the tape 20 to prevent the tape 20 from passing through aperture 16 into the case 12. The stop 24 includes upper flanges 28 and a lower flange 24 which are oppositely disposed and generally orthogonal to the tape 18 for engaging a work piece during measurements. An attachment arm 30 of the stop 24 facilitates rivet attachment thereof to the distal end of the tape 20.

A concave surface 32 of tape 20 includes lineal graduations 22 which may be of either U.S. or metric scale or any other convenient scale of linear measurement. This scale extends along substantially the entire length of the tape 20.

An important aspect of the opening 16 of case 12 is that, generally the lower margin 16a makes substantial rubbing contact with the central portion of the convex surface of tape 20. As a result, any typical coating or covering material applied to this convex or lower surface of tape 20 will eventually become abraded away as a result of the repeated extension and retraction of the tape 20 during normal use.

Figure 3:
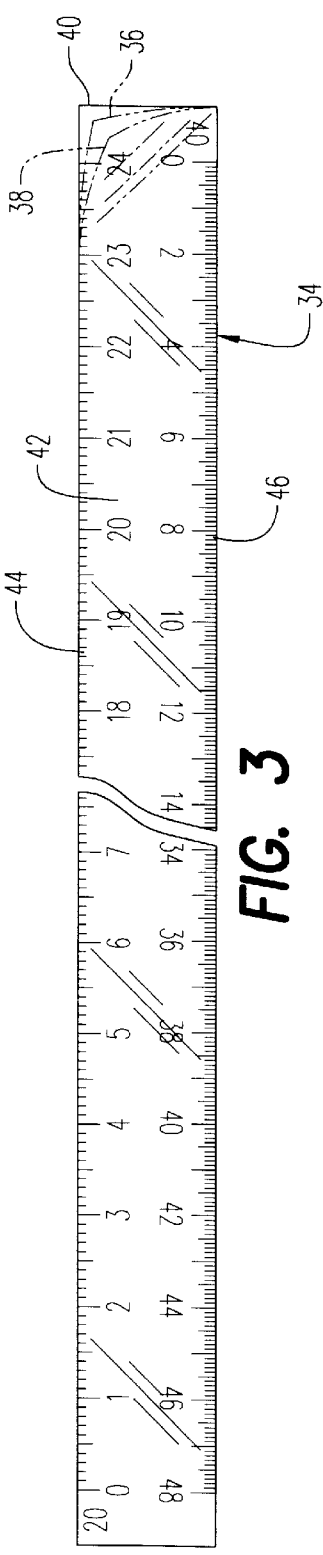
FIG. 3 is a top plan view of the adhesive strip or laminate ready for adhesive attachment onto the distal portion of the convex side of the tape of FIG. 1.
Figure 4:
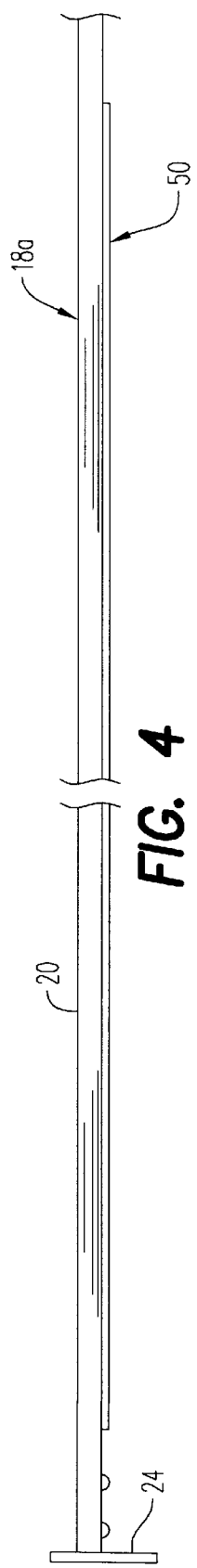
FIGS. 4 and 5 are side elevation and top plan views, respectively, of a distal portion of a tape of another embodiment of the invention.
Figure 5:
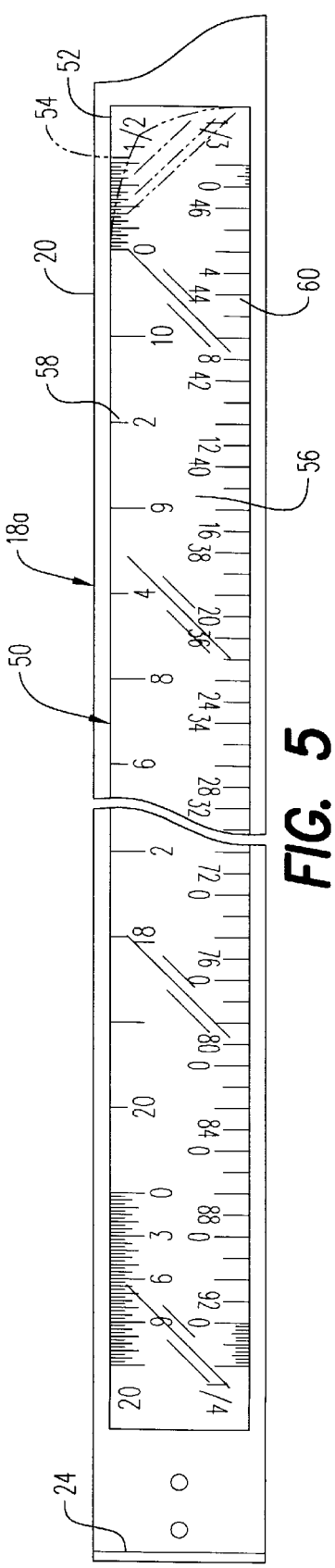

Referring particularly to FIGS. 2 and 3, the tape assembly 18 also includes an elongated thin two-layer adhesive strip or laminate or applique 34 which is adhesively attached to the convex surface of the distal portion of tape 20. Preferably, one end of the laminate 34 is positioned against or in proximity to the stop 24 as seen in FIGS. 4 and 5. The adhesive strip 34 is preferably formed of two separate layers 36 and 38 permanently adhered together. Layer 36 is formed of thin opaque preferably white plasticized flexible vinyl having a thickness of about 4 mils (0.004") coated on one side with a permanent pressure-sensitive acrylic adhesive. A removable backing 40 protects the adhesive surface of the opaque layer 36 until it is ready to be adhered in place on the convex surface of the tape 20. Transparent protective layer 38 is formed of a very thin (1 mil–0.001") sheet of clear polyester over laminate.

Two separate scales 44 and 46 are imprinted onto the non-adhesive coated opposite surface 42 of the opaque layer 36. In this example of FIG. 3, each of the scales 44 and 46 are of an architectural nature in that they are proportional to conventional reduced size scales used in architectural drawings and plans. In this example, scale 44 has graduations in a ratio of 20 to 1 in the U.S. measurement system. That is to say that each scale increment between major graduations of scale 44 equals twenty times that length on an architectural drawing of the same scale. Likewise, scale 46 includes major graduation at a scale reduction of 40:1. Obviously, the opaque layer 34 may include any other useful, convenient architectural scale in either U.S. or metric terms as desired. In fact, it is envisioned that, for marketing purposes, a broad array of such architectural scales will be made available on different adhesive strips 34.

Note further that the overall length of the adhesive strip or laminate 34 is substantially shorter than the overall length of the tape 20 onto which it is, or is intended to be, adhered on the convex surface of tape 20 as seen in FIG. 2. Such a length for the adhesive strip 34 is envisioned in the range of 10" (25.4 mm.) to 36" or 1 meter as desired. The preferred length would be 12".

As seen in FIGS. 4 and 5, another embodiment of the tape assembly 18a is there shown wherein another embodiment of the adhesive strip shown generally at numeral 50 is adhesively attached to the bottom or convex surface of tape 20 as shown. This embodiment 50 also includes an opaque white vinyl layer 52 as previously described and a transparent protective layer 54 which is permanently attached to the non-adhesive coated surface 56 of the opaque layer 52. Two different engineering scales 58 and 60 are imprinted on the non-adhesive exposed surface of opaque layer 52, linear scale 58 having major divisions equaling actual U.S. measurements of ½" and 1", respectively, while scale 60 includes full-scale graduations of ⅛" and ¼" respectively.

The preferred form of the laminate material is again as above described and is readily available in blank stock form or with standardized or custom printing. However, only a single opaque or transparent vinyl layer may be utilized in the alternate embodiment of this invention. In such an embodiment, one side is adhesively coated and the other side is imprinted with one or more suitable scales differing in graduations and distinctive usefulness from that of the conventional scales printed on the concave side of a tape. Adhesive coated vinyl material from the 3M Corporation having a thickness of 4 mils (0.004"), 3M Scotch Cal having a thickness of 2 mils (0.002") and others of a similar nature may be utilized with adequate durability and wear-resistance.

It is important to re-emphasize the primary features which the present invention provides and is not met in prior art. The first is a foreshortened scale applied to the convex normally unused side of a tape measure having a wide variety of scales and graduations which are different and distinct form those normally applied to the concave side of the tape. Only shorter scales of this type are required in making smaller measurements on a periodic basis The second feature is with respect to the durability of the scales and graduations which are permanently adhesively applied to the convex surface of only the distal portion of the tape. Two important features are provided in this respect. The first is with respect to the extremely scratch-resistant nature of the materials taught by this invention and the second is with respect to the extreme thinness of the adhesive strip or laminate to the convex surface of the tape. Both work together to prevent any malfunction or unsmooth, disruptive movement of the tape assembly 18 or 18a as it is moved in and out of the case 12. Moreover, by providing a separate adhesive-backed vinyl laminate as above described, any existing conventional tape measure may be converted into a multi-scale measuring device on the normally unused convex surface of the tape, the new and distinctive scales and graduations being selectable prior to permanent adhesive installation thereof.

There are many other applications for the present invention associated with adhering the above-described indicia in printed laminate or vinyl strip as above described. Such other applications include standard information concerning brick and block coursing, standard window and door opening dimensions used in construction, formulas for calculating concrete volume and building code information. Because every contractor carries a tape measure generally as above described, the addition of this information applied as indicia to the adhesive laminate of the present invention would be a very useful addition to such existing tape measures which currently have nothing imprinted on the convex or back side of the tape.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A tape measure for measuring a linear distance comprising:
   a tape having a concave side and a convex side each oriented lengthwise of said tape;
   a case for housing said tape in a coiled retracted configuration within said case;
   said tape having one end secured within said case, the other free end being extendible from said case to a substantially full length of said tape;
   said concave side having first graduations of a first linear scale extending along substantially the full length of said tape, said first linear scale being in metric or U.S. units of linear measure;
   said convex side having second graduations of a second linear scale extending along only a relatively short portion of a length of said tape from in close proximity to said free end;
   said second linear scale being different and distinct from said first linear scale and calibrated for a different and distinct use;
   said second linear scale is formed of a thin laminate onto one side of which said second linear scale is printed and having an adhesive on another side thereof which is attached to said convex side of said tape.

2. A tape measure as set forth in claim 1, wherein:
   said second linear scale is an architectural scale, said graduations thereon being proportional to a substantially larger actual unit of measure.

3. A tape measure as set forth in claim 1, wherein:
   said second linear scale is an engineering scale, said graduations thereon being actual size in metric or U.S. units of linear measure and different from those of said first linear scale.

4. A tape measure as set forth in claim 1, wherein:
   said laminate also includes a transparent abrasion-resistant protective layer attached against and substantially covering said second linear scale and said opaque layer.

5. In an improved tape measure for measuring a linear distance including a tape having a concave side and a convex side each oriented lengthwise of said tape, a case for housing said tape in a coiled retracted configuration within said case, said tape having one end secured within said case, the other free end being extendible from said case to a substantially full length of said tape, said concave side having first graduations of a first linear scale extending along substantially the full length of said tape, said first linear scale being in metric or U.S. units of linear measure, the improvement comprising:
   said convex side having second graduations of a second linear scale extending along only a relatively short portion of a length of said tape from in close proximity to said free end;
   said second linear scale being different and distinct from said first linear scale and calibrated for a different and distinct use;
   said second linear scale is formed of a thin laminate onto one side of which said second linear scale is printed and having an adhesive on another side thereof which is attached to said convex side of said tape.

6. The improved tape measure of claim 5, wherein:
   said second linear scale is an architectural scale, said graduations thereon being proportional to a substantially larger actual unit of measure.

7. The improved tape measure of claim 5, wherein:
   said second linear scale is an engineering scale, said graduations thereon being actual size in metric or U.S. units of linear measure and different from those of said first linear scale.

8. The improved tape measure as set forth in claim 5, wherein:
   said laminate also includes a transparent abrasion-resistant protective layer attached against and substantially covering said second linear scale and said opaque layer.

9. An adhesive strip attachable to a tape measure used for measuring a linear distance, the tape measure comprising:
   a tape having a concave side and a convex side each oriented lengthwise of said tape;
   a case for housing said tape in a coiled retracted configuration within said case;
   said tape having one end secured within said case, the other free end being extendible from said case to a substantially full length of said tape;
   said concave side having first graduations of a first linear scale extending along substantially the full length of said tape, said first linear scale being in metric or U.S. units of linear measure;
   said adhesive strip comprising:
   a thin laminate onto one side of which a second linear scale is printed and having an adhesive on another side thereof for attachment to said convex side of said tape;
   said second linear scale extending along only a relatively short portion of a length of said tape from in close proximity to said free end;
   said second linear scale having graduations which are different and distinct from those of said first linear scale and calibrated for a different and distinct use.

10. An adhesive strip as set forth in claim 9, wherein:
said second linear scale is an architectural scale, said graduations thereon being proportional to a substantially larger actual unit of measure.

11. An adhesive strip as set forth in claim 9, wherein:
said second linear scale is an engineering scale, said graduations thereon being actual size in metric or U.S. units of linear measure and different from those of said first linear scale.

12. An adhesive strip as set forth in claim 9, wherein:
said opaque layer is formed of flexible, plasticized vinyl having a thickness of up to 5 mils (0.005");
said transparent layer is formed of a polyfilm having a thickness of about 1 mil (0.001").

13. The improved tape measure as set forth in claim 9, wherein:
said laminate also includes a transparent abrasion-resistant protective layer attached against and substantially covering said second linear scale and said opaque layer.

14. A tape measure for measuring a linear distance consisting essentially of:
a tape having a concave side and a convex side each oriented lengthwise of said tape;
a case for housing said tape in a coiled retracted configuration within said case;
said tape having one end secured within said case, the other free end being extendible from said case to a substantially full length of said tape;
said concave side having first graduations of a first linear scale extending along substantially the full length of said tape, said first linear scale being in metric or U.S. units of linear measure;
said convex side having second graduations of a second linear scale extending along only a relatively short portion of a length of said tape from in close proximity to said free end;
said second linear scale being different and distinct from said first linear scale and calibrated for a different and distinct use.

15. In an improved tape measure for measuring a linear distance including a tape having a concave side and a convex side each oriented lengthwise of said tape, a case for housing said tape in a coiled retracted configuration within said case, said tape having one end secured within said case, the other free end being extendible from said case to a substantially full length of said tape, said concave side having first graduations of a first linear scale extending along substantially the full length of said tape, said first linear scale being in metric or U.S. units of linear measure, the improvement consisting essentially of:
said convex side having second graduations of a second linear scale extending along only a relatively short portion of a length of said tape from in close proximity to said free end;
said second linear scale being different and distinct from said first linear scale and calibrated for a different and distinct use.

* * * * *